Oct. 26, 1954    J. STANITZ ET AL    2,692,602
AUTOMATIC DISHWASHING APPARATUS
Filed Sept. 16, 1950    6 Sheets-Sheet 1

Inventors
Jacques Stanitz,
Myron E. Ullman Jr. and
John L. Habe

By Freese and Bisley  Attorneys

Fig. 3

Inventors
Jacques Stanitz,
Myron E. Ullman Jr.
John L. Habe

By Freose and Bisley Attorneys

Oct. 26, 1954     J. STANITZ ET AL     2,692,602
AUTOMATIC DISHWASHING APPARATUS
Filed Sept. 16, 1950     6 Sheets-Sheet 3

Inventors
Jacques Stanitz,
Myron E. Ullman Jr. and
John L. Habe

By Frease and Bush
Attorneys

Oct. 26, 1954　　　　　J. STANITZ ET AL　　　　　2,692,602
AUTOMATIC DISHWASHING APPARATUS
Filed Sept. 16, 1950　　　　　　　　　　　　　　　　　6 Sheets-Sheet 4

Inventors
Jacques Stanitz,
Myron E. Ullman Jr. and
John L. Habe

By Frease and Bishop  Attorneys

Oct. 26, 1954   J. STANITZ ET AL   2,692,602
AUTOMATIC DISHWASHING APPARATUS
Filed Sept. 16, 1950   6 Sheets-Sheet 5

Inventors
Jacques Stanitz,
Myron E. Ullman Jr. and
John L. Habe
By Freass and Bisley  Attorneys

Patented Oct. 26, 1954

2,692,602

UNITED STATES PATENT OFFICE 2,692,602

AUTOMATIC DISHWASHING APPARATUS

Jacques Stanitz, Warren, Myron E. Ullman, Jr., Canfield, and John L. Habe, Cleveland, Ohio, assignors to Mullins Manufacturing Corporation, Salem, Ohio, a corporation of New York Application September 16, 1950, Serial No. 185,232

28 Claims. (Cl. 134—57)

The invention relates generally to dishwashing machines, and more particularly to a novel dishwasher for automatically, in a timed cycle, supplying the dishwasher tub with a washing medium, washing and rinsing the dishes, and finally opening the tub lid.

Prior automatic dishwashers have required complicated and expensive mechanisms for automatically controlling the tub lid, the drain valve, the liquid circulating means and the tub supply valve; and further complicated mechanism for automatically shutting off the circulation of washing medium if the lid is opened during the washing cycle. Moreover, in many such prior dishwashers the control of the supply valve for the washing medium has been dependent upon a predetermined quantity or liquid level within the tub, and variations in water hardness and in the amount of detergent used frequently will materially change the proper quantity or liquid level of the washing medium.

It is a general object of the present invention to provide a simple and inexpensive, but efficient dishwasher for operating automatically in a timed cycle.

Another and more specific object is to provide novel mechanism for automatically supplying washing and rinsing media to the dish receptacle or tub at proper times during the cycle.

Another object is to provide novel means permitting manual opening of the lid at any time during the cycle, together with means automatically stopping circulation of the washing medium when the lid is opened during the washing or rinsing operation.

A further object is to provide novel means for automatically opening and closing the tub drain at proper times during the washing cycle.

Another object is to provide novel mechanism for automatically opening the tub lid at the end of the cycle.

A still further object is to provide an improved automatic dishwasher having a novel timer mechanism automatically controlling the operation of the drain valve, the supply valve, the circulating pump, and the lid opening mechanism in a time cycle.

Finally, it is an object of the present invention to provide a novel dishwasher adapted to wash dishes clean automatically with a minimum amount of mechanical trouble, and a minimum of repairs and adjustments.

These and other objects are accomplished by the parts, constructions, mechanisms, combinations and sub-combinations comprising the present invention, preferred embodiments of which are shown in the accompanying drawings as exemplifying the best known modes of carrying out the inventions, said inventions being described in general terms in the following general statement, and being set forth in detail in the accompanying specification, the scope of the inventions being defined in the appended claims.

In general terms, the automatic dishwasher comprising the present invention includes a tub having a washing medium supply line connected thereto and a normally closed mechanically actuatable valve in said line, a recirculating pump connected to outlet and inlet connections at the bottom of the tub for pumping washing medium into and out of the tub, a diaphragm-controlled switch operated by the pressure in the said tub inlet, a solenoid-operated drain valve connected between the said tub outlet connection and a drain pipe, a starting switch manually operable by a starting knob which also manually opens the tub lid, a pump and solenoid controlling switch, a timer cam rotated by a timer motor and selectively operating said supply valve, said pump and solenoid switch, and said starting switch; said diaphragm switch selectively controlling the timer motor, and a relay switch operated by a lid closing and opening movement for controlling operation of said pump.

Referring to the drawings in which preferred embodiments of the inventions are shown by way of example.

Similar numerals refer to similar parts throughout the drawings.

The dishwashing apparatus of the present invention preferably includes a tub or vat indicated generally at 21, and preferably formed from sheet metal in a well known manner. The tub is preferably supported within a sheet metal cabinet indicated generally at 22 having a recessed base 23, and side walls 24, and a removable panel 25 may be mounted at the front of said cabinet and a door 26 with a pull handle 27 may also be mounted on the cabinet. The cabinet 22 may house the dishwashing apparatus only, or it may be extended laterally to provide a combination sink and dishwasher cabinet.

Figure 3:
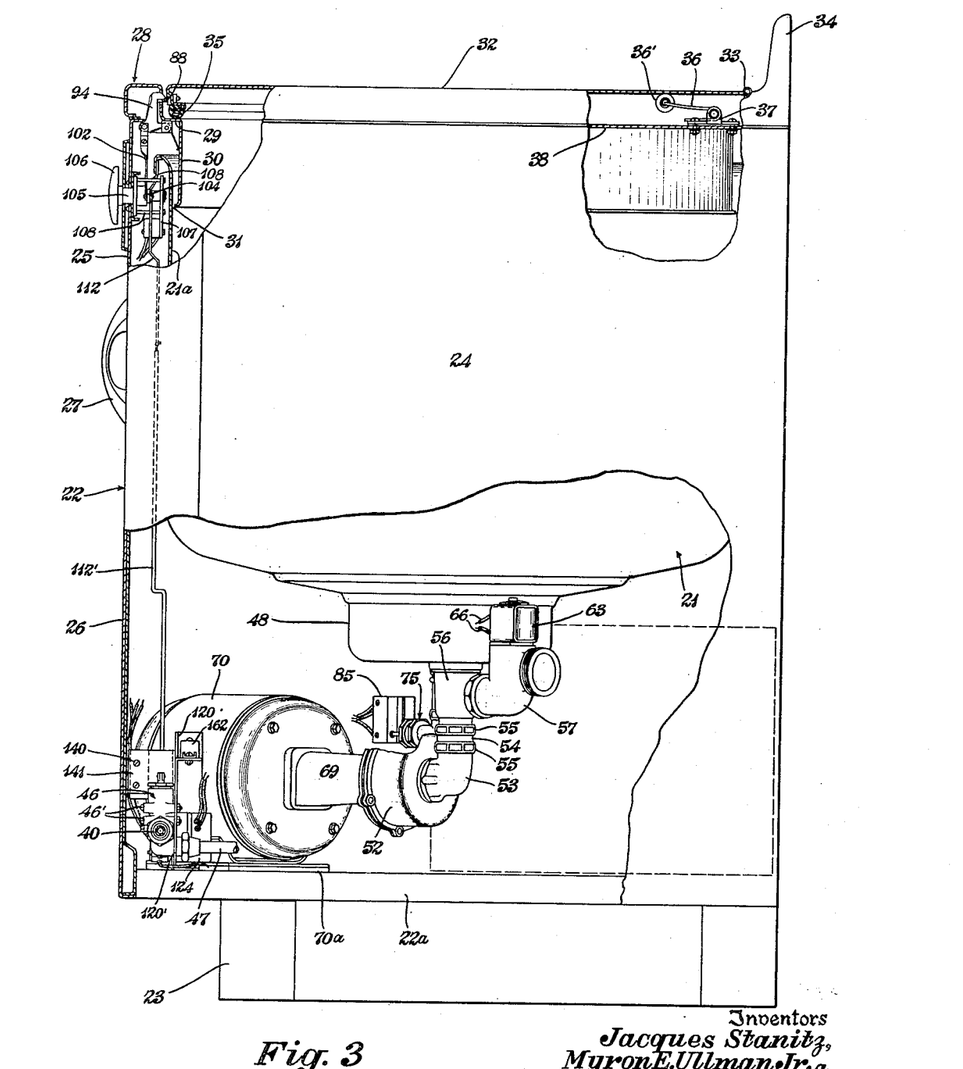
Fig. 3 is a side view of the dishwasher and cabinet, parts being broken away and in section.

The cabinet top indicated generally at 28 preferably includes a top wall 28' and a recessed inner shoulder 29 connecting with a downwardly extending flange 30 which extends within and overlaps the upper portion of the tub wall 21a, as shown in Fig. 3. The bottom edge of flange 30 is spaced from the tub wall so as to provide a narrow annular vent between the tub and cabinet top as indicated at 31. The vent 31 provides for the escape of vapors within the tub, and this construction is described and claimed in our copending application, Serial No. 178,054, filed August 7, 1950, and entitled Dishwashing Apparatus. The lid 32 for the dishwasher tub is hinged at 33 on the cabinet top adjacent the splash back 34 thereof, and the lid carries a rubber gasket 35 which seats on the shoulder 29.

The lid may be urged upwardly toward open position by spring hinges 36 of usual construction including spring-pressed rollers 36' engaging the underside of the rear portion of the lid, said spring hinges being mounted on brackets 37 attached to flanges 38 on the inside of the cabinet top.

Figures 1, 2:
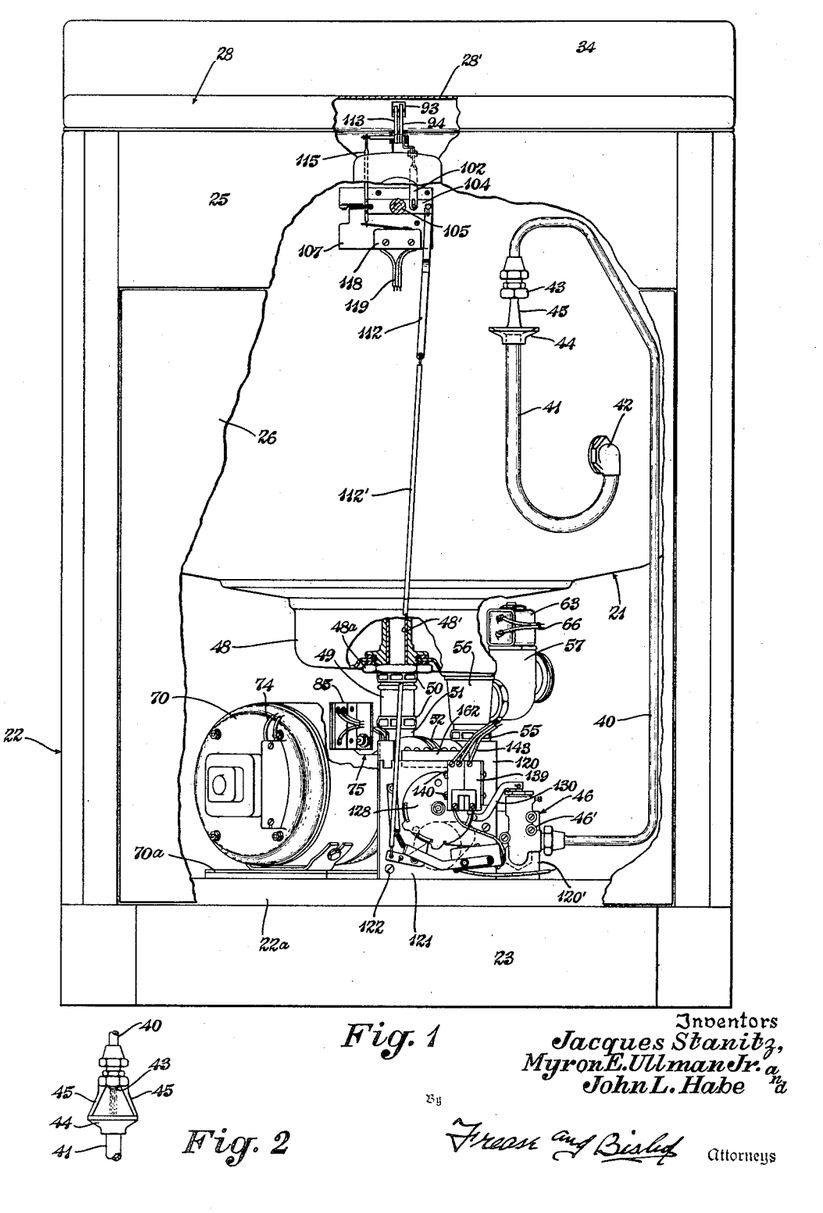
Figure 1 is a front elevation, partly broken away, of the novel dishwashing apparatus mounted within a cabinet.
Fig. 2 is a fragmentary side elevation of the air gap in the supply line connected to the side of the tub.

A water supply pipe 40 preferably is connected through an air gap device to one end of a gooseneck inlet pipe 41. The other end of pipe 41 is connected with the interior of the tub by means of a suitable fitting 42. The air gap device is of a well known construction and includes a downwardly directed nozzle 43 on the upper end of pipe 40 discharging into a funnel-shaped upper end 44 on pipe 41, the nozzle 43 being supported on end 44 in spaced relation thereto by laterally spaced arms 45. The gap between the nozzle and and funnel end 44 prevents siphoning of the tub contents into the supply line.

Figure 4:
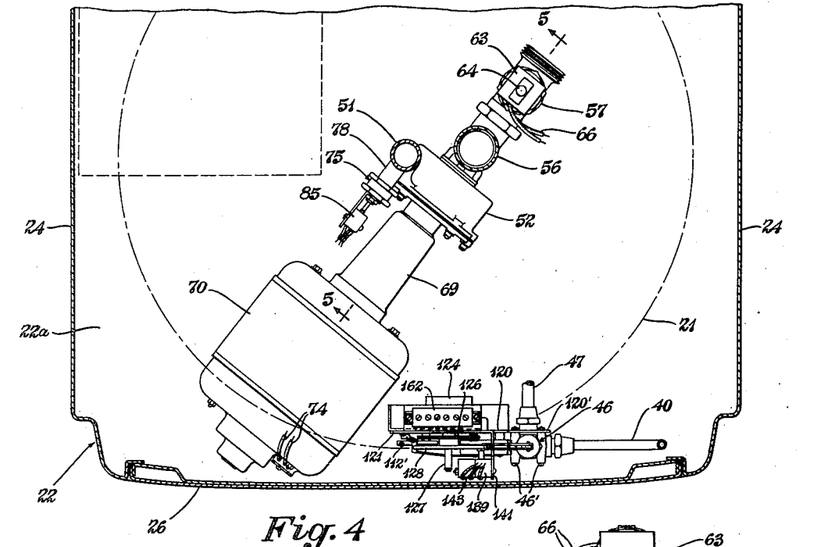
Fig. 4 is a fragmentary plan sectional view taken at the bottom of the tub, showing the relative location of the tub in the dot-dash circle.

The lower end of pipe 40 is connected to the outlet of a supply valve indicated generally at 46, the inlet of the valve being connected to a pipe 47 (Fig. 4) which may lead from a hot water service line. If desired, the usual hot water service line may be connected to a booster heater for raising the water temperature to a desired degree for effectively cleaning the dishes. The booster heater may be conveniently located within the cabinet 22, as indicated in broken lines in Figs. 3 and 4. In such case, the valve inlet is connected to the hot water supply or service line 47 and the booster heater is connected in series in line 40 between the valve outlet and air gap nozzle 43.

*Pump connections to tub*

The bottom wall of the tube 21 is preferably provided with a central depending well or sump 48, and a tub inlet pipe 48' is mounted in the center of said well by means of a nut 48a. The tub inlet pipe is detachably connected, by means of a piece of flexible hose 49 and hose clamps 50 to the outlet 51 of a centrifugal pump 52. A pump inlet elbow 53 located axially on the pump is detachably connected, by means of a piece of flexible hose 54 and hose clamps 55, to a tub outlet drain T 56 mounted in the well 48 radially outward of the nut 48a. Thus the pump is in effect connected in series with the tub inlet 49 and outlet 56. The side outlet of the T 56 is connected to a drain valve 57 which has a drain outlet connection for being screwed to a usual waste pipe.

Thus, when the drain valve 57 is closed, the pump 52 recirculates washing medium or liquid collected in the well 48 through the T 56 and elbow 53 to the pump, and from the pump through the pump outlet 51 and hose 49 back into the tub inlet at the center of the well. The washing medium thus entering the inlet pipe 48' preferably is connected with a spray means for spraying the medium outwardly against the dishes arranged within the tub, after which the washing medium flows downwardly over the sides of the tub and again collects in the well 48. If desired, the spray means may include a revolving spray column mounted on a central standpipe, which may be an extension of inlet pipe 48'; such as disclosed and claimed in our co-pending application, Serial No. 178,054, although other spray means may be used within the scope of the invention defined in the claims.

*Drain construction*

Figure 5:
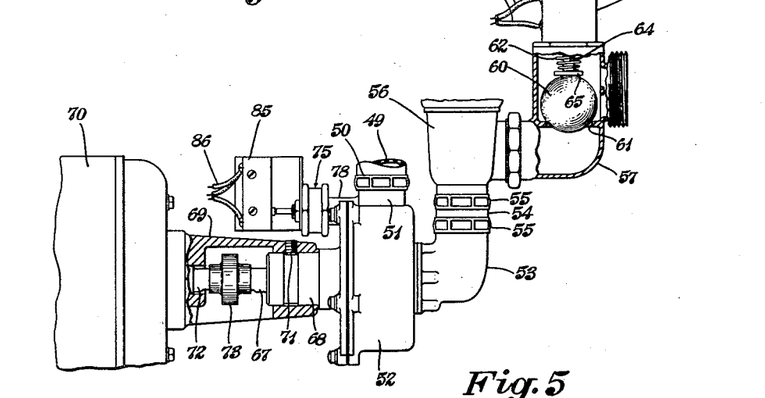
Fig. 5 is an enlarged sectional view, partly in elevation, as on line 5—5, Fig. 4.

As shown in Fig. 5, the drain valve 57 includes a ball 60, preferably of rubber or the like, normally held in closed position on its seat 61 by a spring 62. A solenoid 63 is provided selectively for releasing the ball, and the solenoid has an armature pin 64 located within the spring 62 and having a shoulder 65 on its bottom end normally urged against the ball by the spring. When the solenoid is energized, the shoulder 65 compresses the spring and allows the ball to be lifted off its seat in response to the pressure of the liquid passing out of the tub through the drain T 56. Electrical conductors 66 connect the solenoid coil in circuit with a source of electric current.

Motor and pump drive connection

The pump shaft 67 is journaled in an axial boss 68 on the pump housing, and the boss 68 fits slidably within the bore of a motor shaft housing 69 projecting axially from the housing of an electric motor 70. The motor 70 may be mounted on a suitable base plate 70a supported on a bottom wall 22a of the cabinet. The boss 68 may be secured in the outer end of said housing 69 by a set screw 71, and the pump shaft is operatively connected to the motor shaft 72 by a coupling 73 located within the housing 69. Thus, by loosening the set screw 71, the pump shaft and motor shaft are easily disconnected by moving them axially of each other. Electrical conductors 74 connect the motor 70 in circuit with a source of electric current.

Diaphragm control of tub fill

A novel diaphragm control is provided for controlling the amount of washing liquid or medium which enters the tub 21 through the supply valve 46 for each phase of the washing cycle. This diaphragm control is indicated generally at 75 and is connected into the pump outlet 51 so as to be actuated by the pressure of the liquid in the pump outlet 51 which pressure is developed by the pump 52.

The pressure head varies according to the density or quality of the solution of water and detergent which may comprise the washing medium, and is not controlled by the amount of liquid within the tub. In other words, the pressure in pipe 51 varies according to the amount of detergent and hardness of water in the washing solution, and the quantity of solution will never be exactly the same for any two successive washing cycles, unless the water hardness is the same and the amount of detergent used is exactly the same, so as to produce exactly the same quality or density in the washing solution being recirculated by the pump.

The diaphragm control 75 preferably includes a two-piece housing, one member 76 of which includes a hollow screw stud 77 for screwing into a threaded boss 78 in the pump outlet 51, and providing communication between the interior of the outlet and the diaphragm chamber within the control device. A resilient diaphragm 79 of rubber or the like is located within the member 76 and provides a water seal across the bore thereof. The diaphragm preferably has an annular bead 79' around its outer rim, and an annular gasket 80 abuts against the annular bead, the gasket being held in place by a beveled annular shoulder 81 on the shank of member 82. Thus the diaphragm is secured in place without danger of injury when the member 82 is screwed into member 76.

Figure 6:
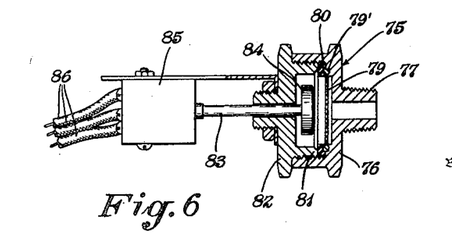
Fig. 6 is a further enlarged detached plan sectional view through the diaphragm control device operating the diaphragm switch.

The housing member 82 has an axial bore through which the shaft 83 of a plunger slidably extends, and the head 84 of the plunger is located within the diaphragm chamber adjacent to the central portion of the diaphragm. The other end of the shaft 83 is operatively connected to a switch which preferably may be a single pole double throw microswitch 85 of usual construction electrically connected by conductors 86 in circuit with the timer motor. Normally, the pole of the switch is spring-held in one of two positions and the plunger is in the position of Fig. 6. When a predetermined pressure is exerted on the diaphragm 79 by the pressure head in the pipe 51, the diaphragm snaps toward the plunger head and moves the plunger toward the microswitch 85, which motion moves the switch to its other position.

The diaphragm 79 is designed so that the predetermined pressure required to actuate it will be reached when the proper quantity of washing solution is in the tub, said proper quantity being variable dependent upon the density or quality of the washing solution, which is in turn dependent upon the hardness of the water and amount of detergent used.

Lid locking construction

Figures 13, 14, 15, 16, 17, 18:
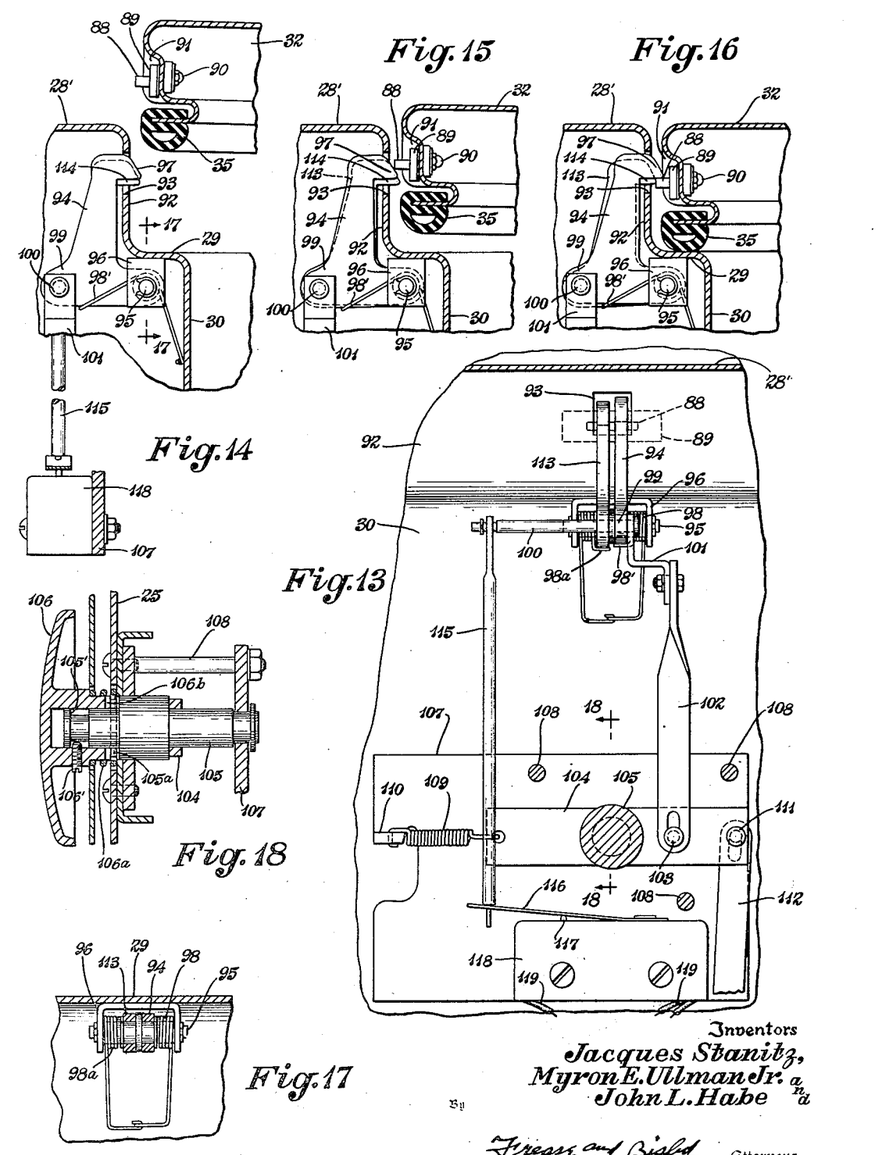
Fig. 13 is an enlarged fragmentary front view showing the lid locking mechanism and the relay switch control.
Fig. 14 is a fragmentary vertical sectional view thereof, showing the lid in open position.
Fig. 15 is a similar view showing the lid approaching closed position.
Fig. 16 is a similar view showing the lid fully closed.
Fig. 17 is a fragmentary vertical sectional view as on line 17—17, Fig. 14.
Fig. 18 is a fragmentary sectional view as on line 18—18, Fig. 13, showing the knob for starting the washing cycle and for manually opening the lid.

The lid locking mechanism is best shown in Figs. 13–17, and includes a strike bar 88 on the front of the lid 32. Preferably, the strike bar projects forwardly from a plate 89 secured by a bolt 90 in a recess 91 in the front edge of the lid 32. When the lid is closed, as shown in Fig. 16, the strike bar is closely adjacent to the vertical wall 92 of the cabinet which extends upwardly from the shoulder 29 to the top wall 28' of the cabinet. The wall 92 is provided with a catch opening 93 located opposite the strike bar 88 in closed position.

A lid locking catch bar 94 is pivotally mounted at its lower end on a pivot pin 95 supported in a U-shaped bracket 96 secured as by welding to the underside of the shoulder 29. The upper end of the bar 94 has a locking projection 97 extending through the opening 93 for engaging over the strike bar 88 in closed position to lock the lid. A coil spring 98 around the pin 95 has one end 98' hooked under the bottom of the catch bar 94 for urging it in a clockwise direction to the lid locking position.

As shown in Fig. 15, as the lid approaches closed position, the strike bar 88 engages the inclined upper surface of the locking projection 97 and rotates the catch bar in a counterclockwise position against the action of the spring 98. When the strike bar passes the point of the projection 97, the spring snaps the projection over the strike bar and holds the lid closed in the position of Fig. 16.

Lid opening mechanism

An ear 99 on the front bottom portion of catch bar 94 is pivotally connected by a pin 100 and angle bracket 101 to the top of a link 102 having a slot at its lower end connected by a pin 103 with one side of a lever bar 104. The bar 104 is provided at its central portion with an operating shaft 105 extending through the front panel 25 of the cabinet and preferably having a circular hand operated knob 106 positioned thereon exteriorly of the cabinet (Fig. 3).

The knob 106 is slidable axially on the front of shaft 105 an amount determined by the axial movement of set screw 106' within the groove 105' of the shaft 105, and the knob is urged axially outward by a spring 106a. In order to turn the shaft, the knob is pushed inwardly and turned until the notch 106b on its shank slips over the pin 105a projecting from opposite sides of the shaft. This requirement of pushing and turning makes it much more difficult for the dishwasher to be operated or the lid opened accidentally.

Preferably the operating shaft is rotatively mounted in a plate 107 supported by bolts 108 in spaced relation behind the panel 25. A spring 109 connects the end of bar 104 opposite the link 102 to an ear 110 on the plate 107 for yieldingly holding the bar in horizontal position. The other end of bar 104 is connected by a pin 111 to a slot in the upper end of a starter switch operating link 112 connected to a link rod 112' which extends downwardly to the timer mechanism.

Manually turning the knob 106 clockwise at any time with the pin 105a and slot 106b engaged will pull down on the link 102 and release the catch 97, allowing the spring hinges 36 to open the lid. This manual operation may be performed without affecting the position of link 112 because of the pin and slot connection between the link 112 and lever 104.

Lid safety catch

A safety catch bar 113 similar to catch bar 94 is mounted on the pivot pin 95 and has a projection 114 on its upper end extending through the opening 93 for being engaged by the strike bar 88 during its opening and closing movement. The lower end of bar 113 is engaged by one end of a spring 98a around pin 95 for urging the bar in a clockwise direction, and the outer ends of springs 98 and 98a are perferably hooked together as shown in Figs. 13 and 17.

Connecting pin 100 extends through an ear on the front end of catch bar 113, and the projecting end of the pin is connected to the upper end of a depending link 115 which at its lower end abuts one end of a spring plate 116. Depressing the link 115 causes the plate 116 to press the switch button 117 of a microswitch 118 mounted on plate 107. The microswitch is a single pole double throw switch of usual construction and is electrically connected by conductors 119 in circuit with the pump motor 70, in a manner to be described. The switch 118 is sometimes referred to herein as a relay switch merely to more clearly distinguish it from other switches.

As the strike bar 88 engages the projection 114 of the safety catch 113 when the lid is approaching closed position, as in Fig. 15, the counterclockwise rotation of catch bar 113 will depress the link 115 and actuate the switch button 117 to move the switch to one of its two positions. Since the projection 114 of the safety catch bar is lower than the projection 97 of locking catch bar 94, the strike bar in its closed position of Fig. 16 continues to hold the safety catch in position depressing the link 115 and actuating the switch. When the lid is opened, as in Fig. 14, the spring 98a will rotate the safety catch clockwise to raise the link 115 and release the switch button, allowing the switch to snap to its other position.

Timer mechanism

The novel timer mechanism is preferably supported on a vertically disposed supporting plate 120 carried on the bottom wall 22a in the front of the cabinet. Preferably the timer is mounted on a plate 121 which is removably secured on the front of plate 120 by screws 122 passing through holes 123 in plate 121, and the supply valve 46 is removably mounted by bolts 46' on an extension 120' of plate 120 extending laterally outward beyond one side of the timer plate 121.

The timer motor 124 is mounted by screws 124a on the back of plate 121, and preferably is a well known type of small synchronous motor which is geared to the pinion 125 on the front of plate 121 for driving the gear 126 clockwise one revolution in about ten minutes. The gear 126 is mounted on the hub of cam plate 128, and this hub in turn is journaled on shaft 127 mounted on timer plate 121. Electrical conductors 124' connect the timer motor 124 in circuit with a source of electric current.

Referring to Figs. 7–12, the cam plate 128 preferably has three radial cam projections A, B and C spaced circumferentially around its periphery and adapted for operating the supply valve 46 at timed intervals. As the cam plate 128 is rotated in a clockwise direction by the timer motor, the cams A, B and C successively engage a roller 129 in the outer end of a lever 130 which is pivotally connected at its inner end to the valve stem 131. Adjacent to the valve stem, the lever carries a fulcrum roller 132 engaging the cap 133 screwed in the valve housing 134, so that the cams A, B and C will rotate the lever counterclockwise about the fulcrum sufficiently to lift upwardly on the valve stem 131 and raise the valve 135 off its seat, as in Fig. 9. This permits water to flow from the inlet passage 47' of the valve into the supply pipe 40.

Figure 7:
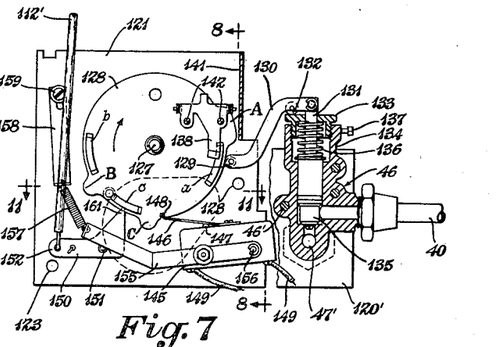
Fig. 7 is an enlarged detached front view of the timer mechanism and supply valve, as on line 7—7, Fig. 8, showing the timer cam in starting position and the supply valve in section and in closed position.

When the roller 129 is not engaged by any of the cams A, B or C, the valve spring 136 holds the valve in the closed position shown in Fig. 7. The screw cap 133 of the valve housing permits adjustment of the location of fulcrum roller 132, and a set screw 137 is provided for holding the cap in adjusted position.

The front surface of cam plate 128 is provided with three forwardly projecting arcuate cams $a$, $b$ and $c$ which are circumferentially spaced and located adjacent to the periphery of the plate. the cams $a$, $b$ and $c$ successively engage the spring finger 138 of a double pole double throw microswitch 139 of well known construction which is rigidly mounted by bolts 140 on an angular flange 141 extending forwardly from the plate 121.

Figure 8:
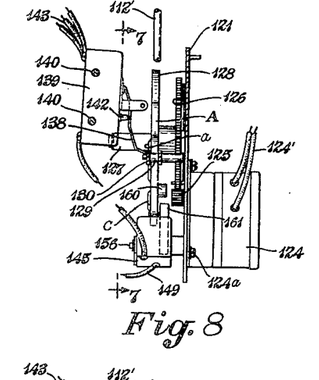
Fig. 8 is a sectional view thereof as on line 8—8, Fig. 7.
Figure 9:
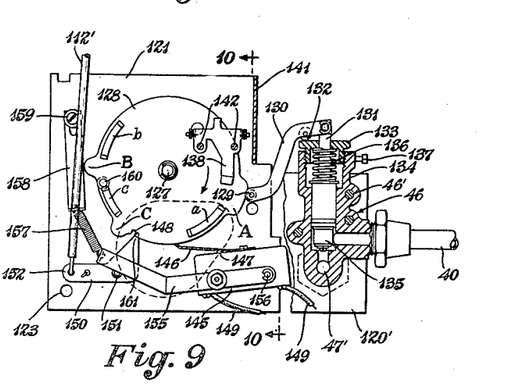
Fig. 9 is a view similar to Fig. 7 showing the timer cam partly rotated and mechanically opening the supply valve.
Figure 10:
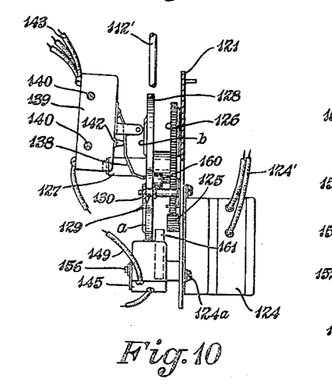
Fig. 10 is a sectional view thereof as on line 10—10, Fig. 9.
Figure 11:
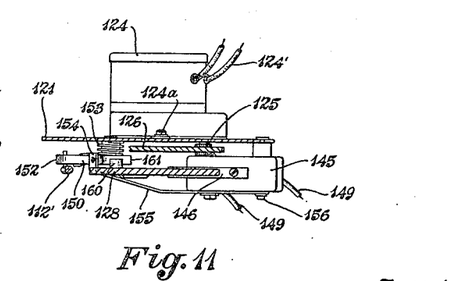
Fig. 11 is a plan sectional view as on line 11—11, Fig. 7.

The spring finger 138 is adapted when engaged by any of the cams $a$, $b$, or $c$ to press inwardly simultaneously both buttons 142 of the switch 139, as in Figs. 7 and 8, for moving the double pole element of the switch into one of its two positions. When the finger drops off any one of said cams $a$, $b$, or $c$, the switch buttons 142 are released, allowing the double pole element to snap to its other position. The switch 139 is electrically connected by conductors 143 in circuit with the timer motor 124, the pump motor 70 and the solenoid 63.

A single pole single throw microswitch 145 is provided for starting the timer mechanism at the beginning of a washing cycle and stopping it at the end of a cycle. The switch 145 is of usual construction and has a spring finger 146 engaging the periphery of the cam plate 128 and pressing the switch button 147 so as to hold the single pole thereof in one of its two positions at all times, except when the cam plate is in starting position, as in Fig. 7. In this position the end of the finger 146 drops into a notch 148 in the periphery of the cam plate, releasing the button 147 and allowing the single pole of the switch to snap into its other or "off" position. The switch 145 is electrically connected in circuit with the switch 139 by means of conductors 149.

Timer starting mechanism

The novel means for actuating the starting switch, when the finger 146 is in the slot 148, is operated by rotating the knob 106 in a counterclockwise direction to lift the link 112. An actuating lever 150 is pivoted on a pin 151 on the plate 121, and is connected at its outer end 152 to the lower end of the link rod 112'. The lever 150 is urged in a counterclockwise direction by a torsion spring 153 (Fig. 11) around pin 151 and having one end hooked in the lever, and the lever is moved in a clockwise direction by lifting the link 112'.

When the lever 150 is thus moved in a clockwise direction about its pivot 151, an intermediate portion of the lever engages the lower edge of an inturned flange 154 on the outer end of an arm 155 secured on and projecting laterally from the switch 145. The switch is pivoted bodily at its outer end portion on plate 121 by means of a pin 156. When the lever 150 moving clockwise engages flange 154, it lifts the arm 155 and rotates the switch 145 bodily clockwise on the pivot 156, pressing the switch button 147 against the finger 146, thereby actuating the switch even though the spring finger is positioned in the notch 148 normally releasing the switch button 147.

The flange 154 on arm 155 is connected by a spring 157 to one end of an arm 158 adjustably secured at its other end to the plate 121 by a screw 159. The spring 157 normally holds the switch 145 with a slight tension in position to be actuated by the spring finger 146 when the cam plate is rotating, but the amount of tension is small enough to allow the spring finger 146 to release the switch button 147 when the finger drops into notch 148.

*Automatic trip for lid opening mechanism*

Figure 12:
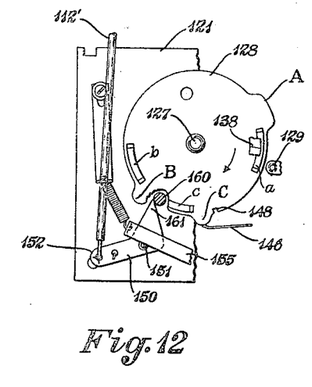
Fig. 12 is a fragmentary view similar to Figs. 7 and 9, showing the cam in position for actuating the lid opening mechanism at the end of a cycle.

The means for automatically opening the lid 32 at the end of the washing cycle preferably includes a rounded projection 160 on the rear side of the cam plate 123, arranged to strike the pointed inner end 161 of the lever 150 and rotate the same slightly in a counterclockwise direction. As shown in Fig. 12, the projection 160 is positioned to engage the lever 150 shortly before the finger 146 drops into the notch 148 and stops the timer. This rotation of the lever 150 pulls downwardly momentarily on the link 112, releasing the catch 94 from locking engagement with the lid and allowing the spring hinges 36 to open the same. After the projection 160 has passed by the point 161, the link 112, 112' is returned to normal position by the spring 98 and also 109 connected to the end of the operating lever 104 opposite to the end thereof which is connected to link 112.

Preferably a suitable cover (not shown) may be provided for sliding over the timer mechanism from the front and engaging the edges of mounting plates 120 and 121. Also a terminal block 162 for all the electrical conductors may be supported on the rear of plate 120, as shown.

*Wiring diagram*

Figure 19:
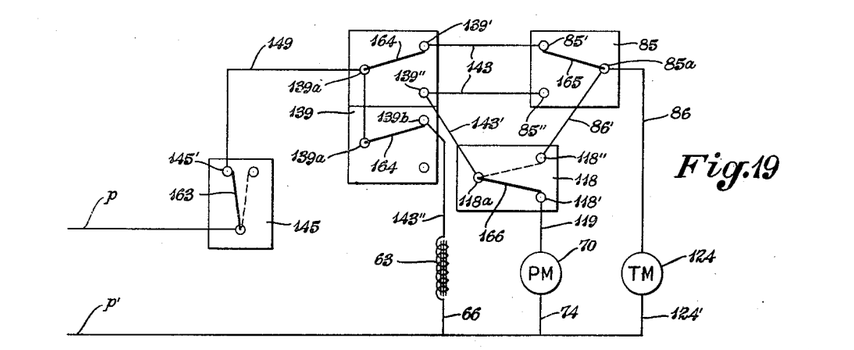
Figs. 19, 20 and 21 are similar wiring diagrams showing the positions of the various switches at different phases in the dishwashing cycle.
Figure 20:
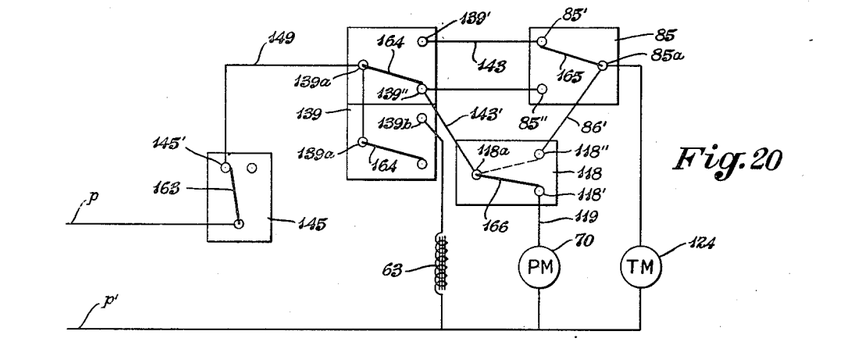
Figure 21:
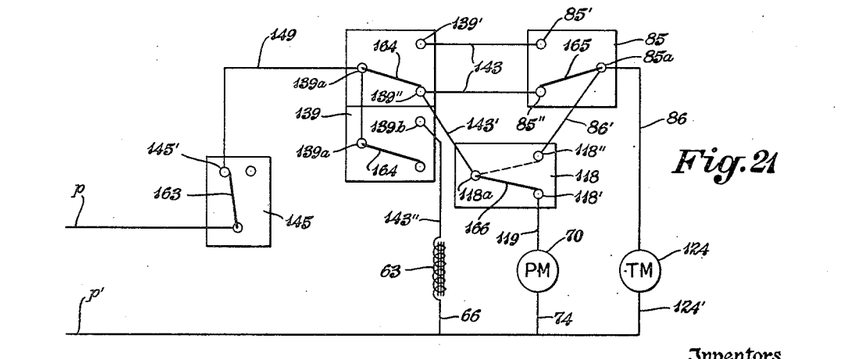

Referring to the wiring diagrams in Figs. 19, 20 and 21, the microswitches 145, 139, 85 and 118 are shown diagrammatically in the electric circuits connecting them with the solenoid 63, the pump motor 70 and the timer motor 124. The two sides of an electric power line are indicated at $p$ and $p'$. In Fig. 19 the dotted-line position of starting switch 145 is the "off" position corresponding to Fig. 7 when the spring finger 146 is in the notch 148 at the end of a washing cycle. When the knob 106 is turned counterclockwise to start the washing cycle, the actuating lever 150 rotates the switch 145 bodily to actuate the single pole 163 thereof to the full-line position of Figs. 19, 20 and 21.

The open terminal 145' of starting switch 145 is connected in series with common terminals 139a of double pole switch 139 by a conductor 149, and one position of the double poles 164 of switch 139 is shown in Fig. 19, while the other position is shown in Figs. 20 and 21. The single pole 165 of the diaphragm switch 85 is shown in one position in Figs. 19 and 20 and in the other position in Fig. 21. The dotted-line position of the single pole 166 of relay switch 118 is the position of the switch when the lid 32 is open, and the full-line position of single pole 166 is the position of the switch when the lid is closed and engages the safety catch 113, in the manner previously described.

The open terminal 139' and closed terminal 139'' of the pump control section of switch 139 are electrically connected by conductors 143 respectively with the open end closed terminal 85' and 85'' of the diaphragm switch 85, and the closed terminal 139'' of switch 139 is also connected by conductor 143' to the common terminal 118a of relay switch 118. The solenoid 63 is connected with the open terminal 139b of the solenoid control section of switch 139 by conductor 143'' and with the other side $p'$ of the line conductor 66. The pump motor 70 is connected with the open terminal 118' of switch 118 by conductor 119 and with the line $p'$ by means of a conductor 74. The closed terminal 118'' of switch 118 is connected by means of a conductor 86' to the common terminal 85a of the diaphragm switch 85, and another conductor 86 connects said terminal 85a with the timer motor 124 which is connected with the line $p'$ by conductor 124'.

*Operation*

In the operation of the novel dishwasher, assuming that the timer is stopped in the starting position of Fig. 7, the recommended amount of detergent is placed in the tub 21, this amount varying depending upon the hardness of the water being used. The soiled dishes are then placed within the tub in an arrangement designed to obtain the most effective washing action from the washing solution when it is directed against the dish surfaces. The lid 32 is then pressed firmly into the closed position shown in Fig. 16, with the gasket 35 pressing against the shoulder 29 and the catch 94 engaging over the strike bar 88 to lock the lid. In this position the safety catch 113 holds the pole 166 of relay switch 118 in the full-line position of Figs. 19, 20 and 21.

The knob 106 is now pushed inwardly against its spring 106a and turned counterclockwise until the notch 106b engages over the pin 105a, then rotated counterclockwise a little farther, held a second or two and then released. This partial counterclockwise rotation of the knob with the notch and pin engaged rotates the bar 104 and lifts the link 112' to actuate starting switch 145 to its full-line position of Fig. 19. In the starting position of the timer, cam $a$ is engaging the finger 138 to hold the poles 164 of switch 139 in the position of Fig. 19, and the pole of diaphragm switch 85 is in its normal position, as shown.

Electric current now flows from the line $p$ through starting switch 145, conductor 149, the upper pole 164 of switch 139, switch 85 and timer motor 124 to the other line $p'$. This starts the timer motor to rotate cam plate 128 in a clockwise direction. Holding the knob 106 in rotated position for a second or two insures sufficient rotation of the cam plate to move the notch 148 away from finger 146, so that the finger continues to actuate the switch 145 after the knob is released. At the same time, the other pole 164 of switch 139 conducts current through conductor 143" to energize the solenoid 63, releasing the ball 60 of drain valve 57.

As the cam plate 128 continues to rotate clockwise the cam A engages roller 129 and opens the supply valve 46 to introduce fresh hot water into the tub through the supply lines 40 and 41. The drain valve stays open for a few seconds after the fresh water starts to enter the tub, in order to warm the tub and drain out any cold water remaining in the well 48 and the pump lines. Within a few seconds after the supply valve has opened, the surface cam a moves out from under finger 138, allowing the poles 164 of switch 139 to move to their other position shown in Fig. 20. In this position of switch 139, current to the timer is cut off and the timer stops, and current to the solenoid is also cut off, allowing the drain valve to close. At the same time current flows from switch 139 through conductor 143' and switch 118 to energize the pump motor, which recirculates the washing solution from the tub through the pump and back into the tub inlet for being directed against the dishes.

Whenever the pressure head of the washing solution in the pump outlet and tub inlet connected thereto reaches a predetermined value dependent upon the density or quality of the washing solution, the diaphragm switch 85 will be actuated, in the manner previously described, to the position shown in Fig. 21, in which the timer motor is again started by current flowing through the upper pole 164 of switch 139, lower conductor 143, diaphragm switch 85 and conductor 86. While the pump is running with insufficient water to bring the pressure in the pump outlet continuously up to the predetermined value, there may be pressure surges of washing solution in the pump outlet sufficient to operate the diaphragm switch momentarily a few times, but the switch will not stay in the position of Fig. 21 until the pressure of the solution is sufficient to maintain a steady pressure through the diaphragm against the diaphragm switch plunger.

After the timer has again started to operate through the circuit shown in Fig. 21, the cam A rotates beyond roller 129 and the supply valve 135 springs to closed position shutting off the water supply to the tub. The pump continues to recirculate washing solution through the tub until the surface cam b reaches the tip of finger 138, and this constitutes the washing part lasting about 4½ minutes of what may be termed phase No. 1 of the washing operation.

When the cam b engages the finger 138 to actuate the switch 139 to the position of Fig. 19, this immediately energizes the solenoid 63 releasing the drain ball, and stops the pump motor. Since the pump motor is no longer causing suction in the direction of the ball seat, the ball floats and the water in the tub drains out. When the pump stops the pressure head acting on the diaphragm switch is reduced, allowing the diaphragm switch to snap to its position of Fig. 19, starting the timer and the first rinse, which may be termed phase No. 2 of the cycle.

During phase No. 2, the same sequence with respect to the electrical circuits occurs, but the supply valve is held open a shorter length of time by the cam B and the complete operation of the first rinse requires only about ½ minute.

After phase No. 2 is completed, the surface cam c engages the spring finger 138 to actuate switch 139 to start the second rinse which may be termed phase No. 3. The spacing of the cams C and a is such that the second rinse occupies about 1½ minutes. The cams B and C are located relative to cams b and c respectively, so that at the start of the first and second rinses, the supply valve opens a few seconds before the drain valve closes.

At the end of phase No. 3, the projection 160 on the rear side of cam plate 128 trips the point 161 of lever 150, as shown in Fig. 12, and pulls downwardly on link 112' to release the catch 94 and allow the lid to pop open due to the action of springs 36. At this time the cam a is engaging finger 138 to actuate switch 139 to the position of Fig. 19 when the pump motor shuts off. The lid opening movement releases catch 113 allowing switch 118 to move to the dotted-line position shown in Figs. 19, 20 and 21. When switch 139 is in position of Fig. 19, the circuit to solenoid 63 is closed and the drain valve actuated to drain the tub. Shortly after the cam a has started to engage finger 138, the diaphragm switch 85 snaps to the position of Fig. 19 due to the lowering of pressure against the diaphragm.

The timer continues to rotate the cam plate 128 until the spring finger 146 drops into the notch 148, allowing the starting switch 145 to move to its dotted-line position of Fig. 19, which shuts off the flow of current to all the circuits, and completes the cycle.

If the operating knob 106 is pushed in and turned counterclockwise to the left with the lid open, the timer will start and complete its cycle, but the relay switch 118 will remain in its dotted-line position, thus preventing the pump motor from operating as long as the lid stays open. If the operating knob is pushed in and turned clockwise to the right to open the lid during any of phases 1, 2 and 3, the pump motor will immediately be shut off, but the timer will continue to operate to complete its cycle, because if the switches are in the position of Fig. 19 or 21 when the lid is opened the timer circuit is already closed, and if they are in the position of Fig. 20, the relay switch 118 in its dotted position shuts off the pump and closes a circuit to the timer motor through conductors 143' and 86'.

Accordingly, the lid can be opened manually by pressing the operating knob and turning it to the right (clockwise) at any time prior to, during, or after operation of the unit. However, since the cycle continues without pumping if the lid is open when the unit is operating, it is advisable, if the lid is opened after the cycle has started for inserting an additional dish or two, to immediately close the lid so that the washing or rinsing action of the pump is not materially shortened. Furthermore, since the pump stops when the lid is opened when the dishwasher is operating, no washing solution is thrown out of the tub when the lid opens.

When the lid opens at the end of the cycle, the hot moist vapor within the tub is released and the retained heat in the dishes and tub quickly dries the dishes by evaporation, after which the clean dishes may be removed for storage or use.

If a power failure should occur during operation of the dishwasher no serious difficulty or damage results. When power failure occurs when the connections are made as shown in Fig. 19, the tub continues to fill with water until the head of water in the tub overcomes the preload of spring 62, which is set to prevent the tub from overflowing through the air gap, and unseats the ball check 60 of drain valve 57 permitting further flow of water into the tub to drain therefrom. If power failure occurs when the connections are as shown in Fig. 20 or 21, the pump and timer stop and since the drain valve solenoid is de-energized, the spring 62 holds the drain valve ball in closed position with no fill water flowing. When power is again restored, the cycle picks up where interrupted and continues to completion.

Since the drain valve 57 is spring loaded and normally held in closed position, it prevents drain water from another source connected with the drain pipe leading from the dishwasher from backing up into the dishwasher in the event of sewer stoppage or back pressure.

In the foregoing detailed description it has been indicated that the water fill valve 46, the timer mechanism, the pump 52, the pump motor 70, the drain valve and solenoid 57–63, the tub 21, the recirculating standpipe 48, and the various switches are each simply and separately mounted. Accordingly, each of these parts or assemblies may be repaired or replaced as a unit readily and individually without disturbing other elements or units of the dishwasher and without completely tearing down the dishwasher for such repair or replacement.

Since the diaphragm control 75 requires that enough water be introduced into the tub to build up the desired washing pressure from the center spray into the tub, the correct amount of washing or rinsing fluid is automatically obtained for each washing or rinsing operation. Thus, variations in water line pressure, or water hardness, or in the amount of detergent do not affect proper operation of the dishwasher. If the city water pressure is low, or water filling flow is slow, or if an excess amount of foam or suds is produced because of excess washing compound, the diaphragm delays operation of the timer until sufficient water is delivered to the pump and tub so that the pump delivers fluid to the center spray at the required pressure.

In other words, the timer "waits" until the pump system has enough water for each successive phase for efficient operation and sufficient pressure in the pump system. Where there is low city water pressure, a cycle might be as much as a half-minute longer than would be the case where the city water pressure is high. The dishwasher always operates with a sufficient amount of water, and it determines this amount itself, automatically. This sufficient amount of water does not depend upon filling the tub during a definite time interval or with a fixed amount of water, but depends, whatever the filling time or amount required upon, upon establishing the desired pressure in the pump system.

Accordingly, the novel dishwasher is foolproof in construction and operation and fully automatic when in operation from the time when a washing cycle is started after loading with soiled dishes and closing the lid until the clean dishes are removed. Furthermore, the various mechanisms which accomplish the filling and draining and the several washing and rinsing operations are relatively simple and inexpensive in construction and require a minimum of adjustment and repair. Finally, the dishwasher construction of the present invention is simple in operation, easy to install, and quick and inexpensive to service.

In the foregoing description, certain terms have been used for brevity, clearness and understanding, but no unnecessary limitations are to be implied therefrom, because such words are used for descriptive purposes herein and are intended to be broadly construed.

Moreover, the embodiments of the improved construction illustrated and described herein are by way of example, and the scope of the present invention is not limited to the exact details of construction.

Having now described the invention, the construction, the operation and use of preferred embodiments thereof, and the advantageous new and useful results obtained thereby; the new and useful constructions, and reasonable mechanical equivalents thereof obvious to those skilled in the art, are set forth in the appended claims.

We claim:

1. Automatic dishwashing apparatus including a tub, a lid, spring hinges mounting said lid on top of the tub and urging said lid toward open position, lid locking means, manual means operable in one direction for releasing said lid locking means, a relay switch, a safety catch operated by opening and closing of said lid for actuating said relay switch, a washing medium supply line connected to the tub, a normally closed mechanically actuatable valve in said supply line, inlet and outlet pipes at the bottom of the tub, a recirculating pump connected in series with said inlet and outlet pipes, a motor for driving said pump electrically connected to said relay switch, a drain valve connected to said outlet pipe, a solenoid selectively operating said drain valve, a diaphragm-controlled switch having its diaphragm communicating with said tub inlet pipe for actuation by the liquid pressure in said pipe, a starting switch manually started by reverse operation of said lid releasing means, a pump motor and solenoid switch electrically connected to said starting switch, said solenoid, said relay switch and said diaphragm switch, a rotary cam plate selectively operating said supply valve and said pump motor and solenoid switch and said starting switch, and a timer motor driving said cam plate, said timer motor being electrically connected to said diaphragm switch.

2. Automatic dishwashing apparatus including a tub, closure means for the tub normally urged to open position, releasable means for locking the closure means in closed position, closure-actuated dishwasher control switch means, valve controlled water supply means for the tub, motor-driven washing-medium-circulating pump means connected in a closed pumping system with the tub, means electrically connecting the pump means with the control switch means, normally-closed solenoid-controlled drain valve means for the tub, pumping system pressure-actuated switch means, manually-actuated starting switch means, pump motor and solenoid switch means electrically connecting the control switch means, the drain valve means, the pressure-actuated switch means and the starting switch means; and timer mechanism operatively connected with and actuated by the pressure-actuated switch means and selectively actuating said water supply means, said pump motor and solenoid switch means and said starting switch means.

3. Automatic dishwashing apparatus including a tub, a lid, spring hinges mounting said lid on top of the tub and urging said lid toward open position, lid locking means, manual means operable in one direction for releasing said lid locking means, a washing medium supply line connected to the tub, a normally closed mechanically actuatable valve in said supply line, inlet and outlet pipes at the bottom of the tub, a recirculating pump connected in series with said inlet and outlet pipes, a motor for driving said pump, a drain valve connected to said outlet pipe, a solenoid selectively operating said drain valve, a diaphragm-controlled switch having its diaphragm communicating with said tub inlet pipe for actuation by the liquid pressure in said pipe, a starting switch manually started by reverse operation of said lid releasing means, a pump motor and solenoid switch electrically connected to said starting switch, said solenoid, said pump motor and said diaphragm switch, a rotary cam plate selectively operating said supply valve and said pump motor and solenoid switch and said starting switch, and a timer motor driving said cam plate, said timer motor being electrically connected to said diaphragm switch.

4. Automatic dishwashing apparatus including a tub, a washing medium supply line connected to the tub, a normally closed mechanically actuatable valve in said supply line, inlet and outlet pipes at the bottom of the tub, a recirculating pump connected in series with said inlet and outlet pipes, a motor for driving said pump, a drain valve connected to said outlet pipe, a solenoid selectively operating said drain valve, a diaphragm-controlled switch having its diaphragm communicating with said tub inlet pipe for actuation by the liquid pressure in said pipe, a starting switch, a pump motor and solenoid switch electrically connected to said starting switch, said solenoid, said pump motor and said diaphragm switch, a rotary cam plate selectively operating said supply valve and said pump motor and solenoid switch and said starting switch, and a timer motor driving said cam plate, said timer motor being electrically connected to said diaphragm switch.

5. Automatic dishwashing apparatus including a tub, valve-controlled water supply means for the tub, motor-driven washing-medium-circulating pump means connected in a closed pumping system with the tub, drain valve means for the tub, pumping system pressure-actuated switch means, starting switch means, pump and drain valve control, means electrically connecting the pump means, the drain valve means, the pressure-actuated switch means and the starting switch means; and timer mechanism operatively connected with and actuated by the pressure-actuated switch means and selectively actuating said water supply means, said pump means, said drain valve means, and said starting switch.

6. In automatic dishwashing apparatus including a tub having a hinged lid, a lid lock, and means normally urging the lid toward open position, a relay switch, a safety catch operated by opening and closing of said lid for actuating said relay switch, a washing medium supply line connected to the tub, a normally closed mechanically actuatable valve in said supply line, inlet and outlet pipes at the bottom of the tub, a recirculating pump connected in series with said inlet and outlet pipes, a motor for driving said pump electrically connected to said relay switch, a drain valve connected to said outlet pipe, a solenoid selectively operating said drain valve, a diaphragm-controlled switch having its diaphragm communicating with said tub inlet pipe for actuation by the liquid pressure in said pipe, a starting switch, a pump motor and solenoid switch electrically connected to said starting switch, said solenoid, said relay switch and said diaphragm switch, a rotary cam plate selectively operating said supply valve and said pump motor and solenoid switch and said starting switch, and a timer motor driving said cam plate, said timer motor being electrically connected to said diaphragm switch.

7. In automatic dishwashing apparatus including a tub having a hinged lid, a lid lock, and means normally urging the lid toward open position, a washing medium supply line connected to the tub, a normally closed mechanically actuatable valve in said supply line, inlet and outlet pipes at the bottom of the tub, a recirculating pump connected in series with said inlet and outlet pipes, a motor for driving said pump, a drain valve connected to said outlet pipe, a solenoid selectively operating said drain valve, a diaphragm-controlled switch having its diaphragm communicating with said tub inlet pipe for actuation by the liquid pressure in said pipe, a starting switch, a pump motor and solenoid switch electrically connected to said starting switch, said solenoid, said pump motor and said diaphragm switch, a rotary cam plate selectively operating said supply valve and said pump motor and solenoid switch, said starting switch being adjacent said cam plate, means on said cam plate for stopping said starting switch at the end of one revolution, and a timer motor driving said cam plate, said timer motor being electrically connected to said diaphragm switch.

8. Automatic dishwashing apparatus including a tub, inlet and outlet pipes connected to the tub, a recirculating pump connected in series with said inlet and outlet pipes, a motor for driving said pump, a drain valve connected to said outlet pipe, a solenoid selectively operating said drain valve, a pump and solenoid switch electrically connected to said pump motor and solenoid for opening said drain valve and simultaneously shutting off said pump motor and for closing said drain valve and simultaneously starting said pump motor, and timer means selectively actuating said switch at timed intervals.

9. In a automatic dishwashing apparatus including a tub having a hinged lid, a lid lock, and means normally urging said lid toward open position, a relay switch, a safety catch operated by opening and closing the lid for actuating said relay switch, inlet and outlet pipes connected to the tub, a recirculating pump connected in series with said inlet and outlet pipes, a motor for driving said pump electrically connected to said relay switch, a drain valve connected to said outlet pipe, a solenoid selectively operating said drain valve, a pump and solenoid switch electrically connected to said relay switch and solenoid for opening said drain valve and simultaneously shutting off said pump motor and for closing said drain valve and simultaneously starting said pump motor, and timer means selectively actuating said pump and solenoid switch at timed intervals.

10. In automatic dishwashing apparatus including a tub having a hinged lid, a lid lock, and means normally urging said lid toward open position, a relay switch, a safety catch operated by opening and closing the lid for actuating said relay switch, inlet and outlet pipes connected to the tub, a recirculating pump connected in series with said inlet and outlet pipes, a motor driving said pump electrically connected to one side of said relay switch, a drain valve, a solenoid selectively operating said drain valve, a pump and solenoid switch electrically connected to said solenoid and the other side of said relay switch, said pump and solenoid switch when the relay switch is closed opening said drain valve and simultaneously shutting off said pump motor and when the relay switch is open closing said drain valve and simultaneously starting said pump motor, and timer means selectively actuating said pump and solenoid switch at timed intervals.

11. Automatic dishwashing apparatus including a tub, valve-controlled water supply means for the tub, motor-driven washing-medium-circulating pump means connected in a closed pumping system with the tub, pumping system pressure-actuated switch means, and timer mechanism operatively connected with and actuated by the pressure-actuated switch means and selectively actuating said water supply means and said pump means.

12. Automatic dishwashing apparatus including a tub, a washing medium supply line connected to the tub, a valve in said supply line, inlet and outlet pipes connected to the tub, a recirculating pump connected in series with said inlet and outlet pipes, a motor for driving said pump, a pump motor switch, a diaphragm actuated by the liquid pressure in said tub inlet pipe, a switch controlled by said diaphragm and electrically connected to said pump motor switch, a cam plate selectively operating said supply valve, and a timer motor driving said cam plate and electrically connected to said diaphragm switch whereby said timer motor is selectively operated by the diaphragm switch.

13. Automatic dishwashing apparatus including a tub, valve controlled water supply means for the tub, motor-driven washing-medium-circulating pump means connected in a closed pumping system with the tub, pump switch means, pumping system pressure-actuated switch means electrically connected with said pump switch means, and timer mechanism operatively connected with and actuated by the pressure-actuated switch means and actuating said water supply means and said pump switch means.

14. Automatic dishwashing apparatus including a tub, a washing medium supply line connected to the tub, a valve in said supply line, inlet and outlet pipes connected to the tub, a recirculating pump connected in series with said inlet and outlet pipes, a motor for driving said pump, a drain valve connected to said outlet pipe, a solenoid selectively operating said drain valve, a pump and solenoid switch electrically connected to said pump motor and solenoid for alternately operating said pump or opening said drain valve, a diaphragm actuated by the liquid pressure in said tub inlet pipe, a switch controlled by said diaphragm, a cam plate selectively operating said supply valve, and a timer motor driving said cam plate and electrically connected to said diaphragm switch whereby said timer motor is selectively operated by said diaphragm switch.

15. Automatic dishwashing apparatus including a tub, valve controlled water supply means for the tub, motor-driven washing-medium-circulating pump means connected in a closed pumping system with the tub, drain valve means for the tub, pump and drain valve control means actuated alternately to operate said pump means or open said drain valve means, pumping system pressure-actuated switch means, and timer mechanism operatively connected with and actuated by the pressure-actuated switch means and actuating said water supply means and said pump and drain valve control means.

16. In automatic dishwashing apparatus including a tub having a hinged lid, a lid lock engageable with the lid, and means normally urging said lid toward open position, a relay switch, a safety catch also engageable with the lid operated by opening and closing movement of the lid for actuating said relay switch, a washing medium supply line connected to the tub, a valve in said supply line, inlet and outlet pipes connected to the tub, a recirculating pump connected in series with said inlet and outlet pipes, a motor for driving said pump electrically connected to said relay switch, a diaphragm actuated by the liquid pressure in said tub inlet pipe, a switch controlled by said diaphragm, a cam plate selectively operating said supply valve, and a timer motor driving said cam plate and electrically connected to said diaphragm switch.

17. In automatic dishwashing apparatus including a tub, closure means for the tub, means for locking the closure means in closed position, closure-actuated dishwasher control switch means, valve controlled water supply means for the tub, motor-driven washing-medium-circulating pump means connected in a closed pumping system with the tub, means electrically connecting the pump means with the control switch means, pumping system pressure-actuated switch means, and timer mechanism operatively connected with and actuated by the pressure-actuated switch means and actuating said water supply means and said pump means.

18. In automatic dishwashing apparatus including a tub having a hinged lid, a lid lock engageable with the lid, and means normally urging said lid toward open position, a relay switch, a safety catch also engageable with the lid operated by opening and closing movement of the lid for actuating said relay switch, a washing medium supply line connected to the tub, a valve in said supply line, inlet and outlet pipes connected to the tub, a recirculating pump connected in series with said inlet and outlet pipes, a motor for driving said pump electrically connected to said relay switch, a pump motor switch, a diaphragm actuated by the liquid pressure in said tub inlet pipe, a switch controlled by said diaphragm and electrically connected to said pump motor switch, a cam plate selectively operating said supply valve, and a timer motor driving said cam plate and electrically connected to said diaphragm switch whereby said timer motor is selectively operated by the diaphragm switch.

19. In automatic dishwashing apparatus including a tub having a hinged lid, a lid lock, and means normally urging said lid toward open position, a relay switch, a safety catch operated by opening and closing movement of the lid for actuating said relay switch, a washing medium supply line connected to the tub, a valve in said supply line, inlet and outlet pipes connected to the tub, a recirculating pump connected in series with said inlet and outlet pipes, a motor for driving said pump electrically connected to said relay switch, a drain valve connected to said outlet pipe, a solenoid selectively operating said drain valve, a pump and solenoid switch electrically connected to said relay switch and solenoid for alternately operating said pump or opening said drain valve, a diaphragm actuated by the liquid pressure in said tub inlet pipe, a switch controlled by said diaphragm, a cam plate selectively operating said supply valve, and a timer motor driving said cam plate and electrically connected to said diaphragm switch whereby said timer motor is selectively operated by said diaphragm switch.

20. In automatic dishwashing apparatus including a tub, closure means for the tub, means for locking the closure means in closed position, closure-actuated dishwasher control switch means, valve controlled water supply means for the tub, motor-driven washing-medium-circulating pump means connected in a closed pumping system with the tub, means electrically connecting the pump means with the control switch means, drain valve means for the tub, pump and drain valve control means operable alternately to operate said pump means or open said drain valve means, pumping system pressure-actuated switch means, and timer mechanism operatively connected with an actuated by said pressure-actuated switch means and actuating said water supply means and said pump and drain valve control means.

21. In automatic dishwashing apparatus including a tub, closure means for the tub normally urged to open position, a strike bar on said closure means, a locking catch engaging said strike bar when the closure is closed, a relay switch, a safety catch abutting said strike bar when the closure is closed, spring means urging said locking catch and safety catch toward said strike bar, said safety catch being operatively connected to said relay switch for actuating the same in response to closing movement of the closure, motor-driven washing-medium-circulating pump means connected in a closed pumping system with the tub, means electrically connecting the pump means with said relay switch, and timer mechanism actuating said pump means and said locking catch.

22. Automatic dishwashing apparatus including a tub, valve controlled water supply means for the tub, motor-driven washing-medium-circulating pump means connected in a closed pumping system with the tub, solenoid-controlled drain valve means for the tub, pumping system pressure-actuated switch means, a cam selectively operating said water supply means, a timer motor driving said cam and electrically connected to said pressure-actuated switch means, and control switch means actuated by said cam selectively energizing said timer motor alone or simultaneously with said solenoid.

23. Automatic dishwashing apparatus including a tub, valve controlled water supply means for the tub, motor-driven washing-medium-circulating pump means connected in a closed pumping system with the tub, solenoid-controlled drain valve means for the tub, pumping system pressure-actuated switch means, a cam selectively operating said water supply means, a timer motor driving said cam and electrically connected to said pressure-actuated switch means, and control switch means electrically connected to said solenoid, pump means and pressure actuated switch means, said cam selectively actuating said control switch means to energize said solenoid and timer motor simultaneously, or said pump motor alone, or said pump motor and timer motor simultaneously.

24. In automatic diswashing apparatus including a tub, motor-driven washing-medium-circulating pump means connected in a closed pumping system with the tub, pumping system pressure-actuated switch means, solenoid-controlled drain valve means for the tub, valve controlled water supply means for the tub; timer mechanism operating said supply means, said pump means and said drain valve means in timed sequence; said timer mechanism including a rotary cam plate selectively operating said supply means, a motor driving said cam plate and electrically connected to said pressure-actuated switch means, control switch means for the pump and drain valve means, cams on the cam plate selectively actuating said control switch means, and said control switch means being electrically connected to said pressure-actuated switch means.

25. In automatic dishwashing apparatus including a tub, valve controlled water supply means for the tub, drain valve means for the tub, motor-driven washing-medium-circulating pump means connected in a closed pumping system with the tub; timer mechanism operating said supply means, said pump means and said drain valve means in timed sequence; said timer mechanism including a rotary cam plate, a motor driving said cam plate, a series of cams on said cam plate selectively operating said supply means, a switch electrically connected to said timer motor and actuated by a predetermined pressure in said pumping system, a pump and drain valve control switch, and a second series of cams on said cam plate selectively actuating said control switch.

26. In automatic dishwashing apparatus having a tub, a washing medium supply line connected to the tub, a valve in said supply line, a tube drain valve, inlet and outlet pipes connected to said tub, and a recirculating pump connected to said pipes; timer mechanism operating said supply valve, said pump and said drain valve in timed sequence, said timer mechanism including a rotary cam plate, a motor driving said cam plate, a series of cams on said cam plate selectively operating said supply valve, multiple pole switch means selectively actuated by said cam plate for operating the pump and closing the drain, and switch means normally de-energizing said timer motor with the supply valve open and actuated by a sufficient amount of washing solution in the tub to energize said timer motor.

27. In automatic dishwashing apparatus including a tub, valve controlled water supply means for the tub, drain valve means for the tub, motor-driven washing-medium-circulating pump means connected in a closed pumping system with the tub; timer mechanism operating said supply means, said pump means and said drain valve means in timed sequence; said timer mechanism including a rotary cam plate, a motor driving said cam plate, a series of cams on said cam plate selectively operating said supply means, control switch means selectively actuated by said cam plate for operating said pump means and closing said drain valve means, and pumping system pressure-actuated switch means normally de-energizing said timer motor with the supply means open and actuated by a predetermined pressure in said pumping system to energize said timer motor.

28. In automatic dishwashing apparatus including a tub, valve controlled water supply means for the tub, drain valve means for the tub, motor-driven washing-medium-circulating pump means connected in a closed pumping system with the tub; timer mechanism operating said supply means, said pump means and said drain valve means in timed sequence; said timer mechanism including a rotary cam plate, a motor driving said cam plate, a series of cams on said cam plate selectively operating said supply means, control switch means selectively actuated by said cam plate for operating said pump means and closing said drain valve means, a diaphragm actuated by liquid pressure in said pumping system, and a switch controlled by said diaphragm for energizing said timer motor.

References Cited in the file of this patent

UNITED STATES PATENTS

| Number | Name | Date |
|---|---|---|
| 1,335,853 | Myrick | Apr. 6, 1920 |
| 1,670,611 | Couch | May 22, 1928 |
| 1,836,373 | Kadesch | Dec 15, 1931 |
| 2,063,746 | Meeker | Dec. 8, 1936 |
| 2,227,077 | Geldhof et al. | Dec. 31, 1940 |
| 2,278,268 | Kempton | Mar. 31, 1942 |
| 2,288,141 | Oliver | June 30, 1942 |
| 2,341,894 | Bariffi | Feb. 15, 1944 |
| 2,390,757 | Voris | Dec. 11, 1945 |
| 2,425,620 | Kempton | Aug. 12, 1947 |
| 2,502,823 | Clark | Apr. 4, 1950 |
| 2,517,109 | Hollerith | Aug. 1, 1950 |
| 2,575,704 | Clark | Nov. 20, 1951 |